Patented Nov. 20, 1934

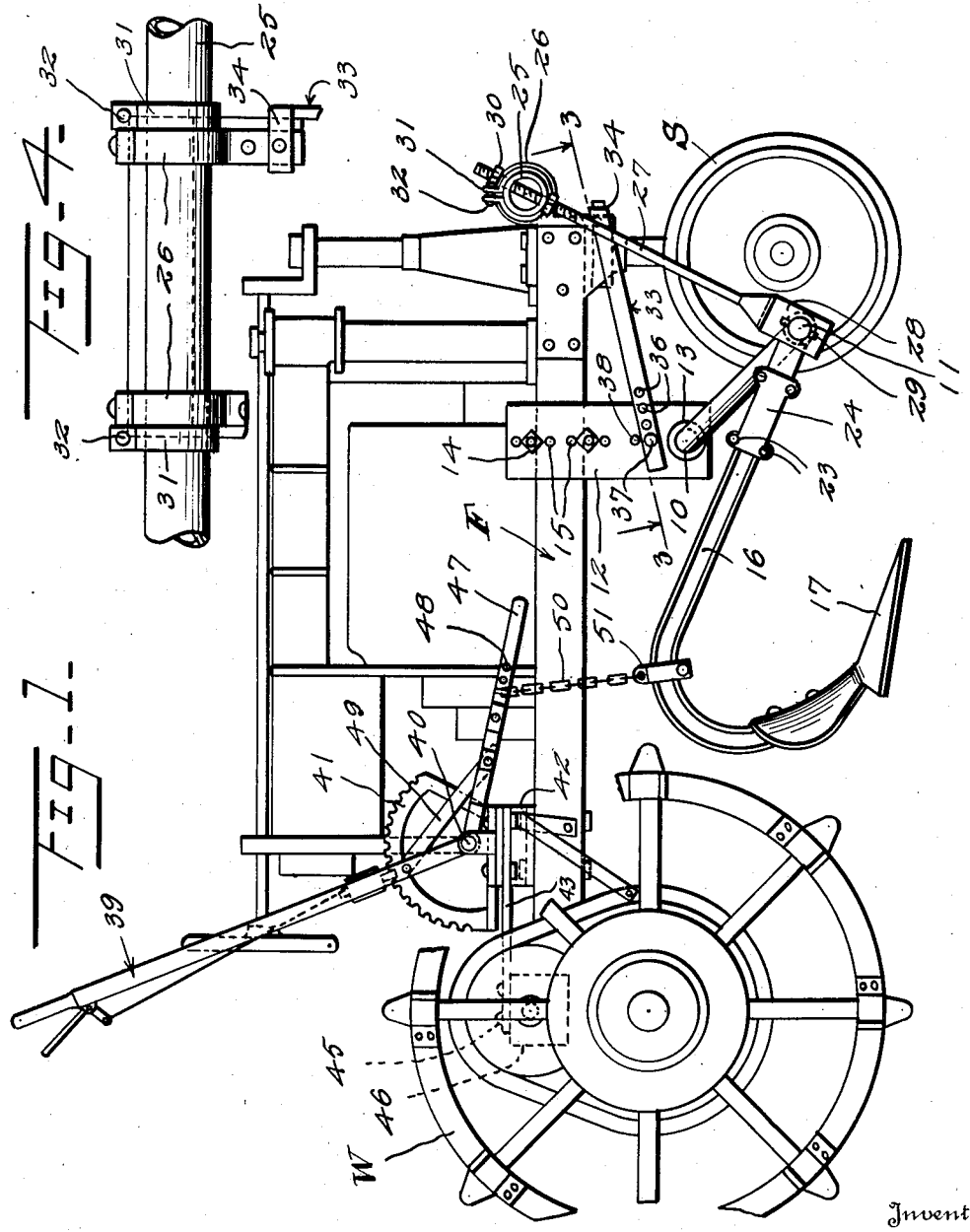

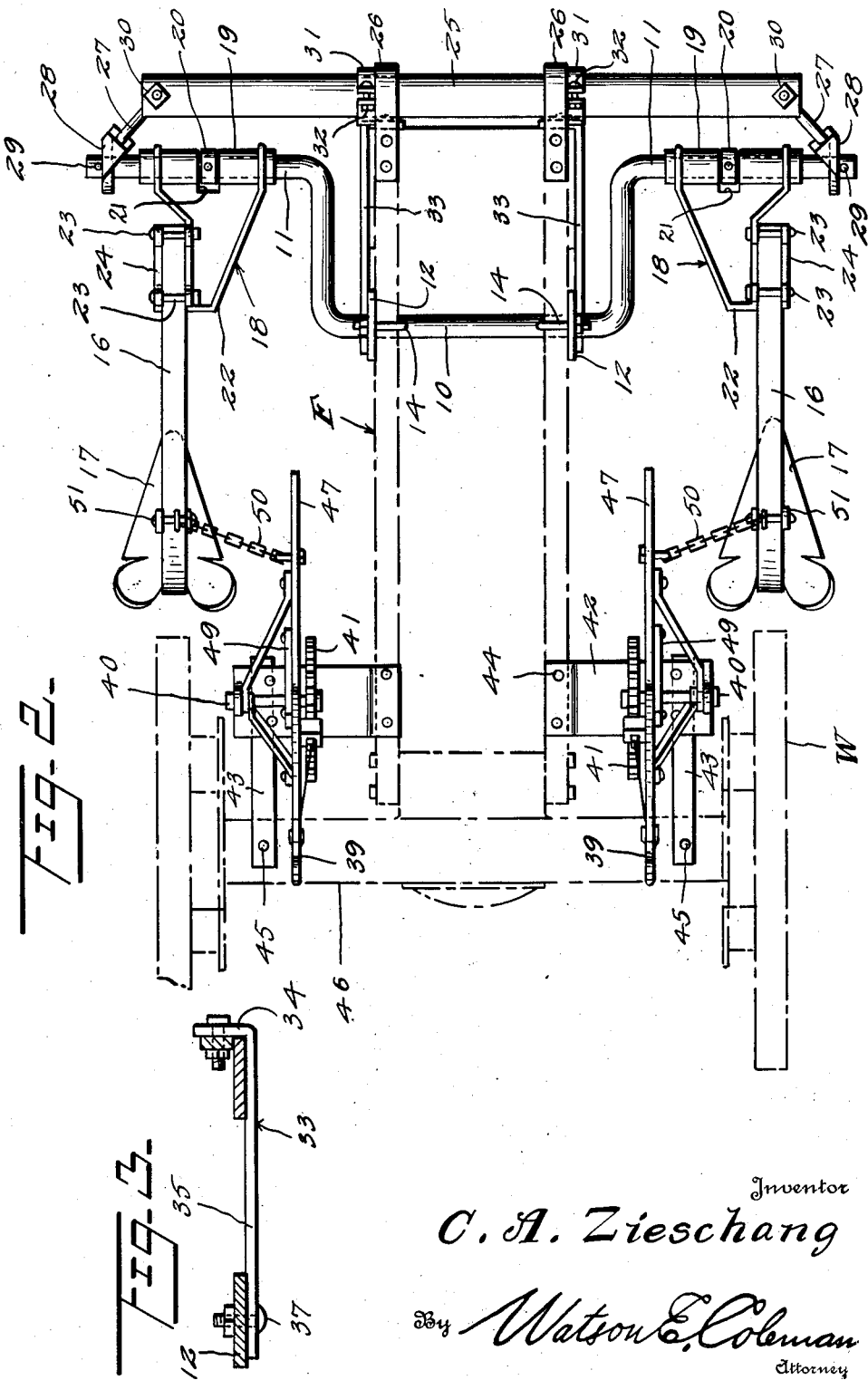

1,981,768

UNITED STATES PATENT OFFICE 1,981,768

TRACTOR MIDDLE BUSTER HITCH

Carl A. Zieschang, Thorndale, Tex.

Application May 20, 1933, Serial No. 672,065

3 Claims. (Cl. 97—47)

This invention relates to cultivating equipment and more particularly to an attachment in the form of a middle buster hitch for a tractor.

An object of this invention is to provide an earth working attachment which can be readily mounted on a tractor of conventional construction so as to loosen the ground for planting purposes.

Another object of this invention is to provide an attachment of this kind which embodies relatively few parts which can be attached quickly to the frame of a tractor without disturbing the present parts of the tractor.

The above and various other objects and advantages of this invention will in part be described and in part be understood from the following detailed description of the present preferred embodiment, the same being illustrated in the accompanying drawings wherein:—

Figure 1 is a detail side elevation partly broken away of a device constructed according to the embodiment of this invention mounted on a conventional tractor.

Figure 2 is a detail top plan view of the device on the tractor which is shown in dotted lines.

Figure 3 is an enlarged sectional view taken on the line 3—3 of Figure 1.

Figure 4 is a fragmentary detail front elevation of the front brace for the draw bar structure.

Referring to the drawings wherein like numerals of reference designate corresponding parts throughout the several views, the letter F designates generally the frame structure of a tractor of conventional construction which is provided with driving wheels W at the rear and a castor or steering wheel structure S at the forward end thereof. A draw bar 10 provided at each end thereof with a bell crank 11 is supported from the frame F by means of a pair of hangers 12 provided with bearings 13. These hangers or draw bar supporting members 12 are secured to the sides of the frame F by means of U-shaped bolts or securing members 14 which extend about the sides of the frame F and pass through selected pairs of holes 15 provided in the draw bar supporting members 12.

An earth working implement comprising a frame 16 having a blade 17 secured thereto is secured to the draw bar 10 on the outer end of the crank portion 11 by means of an attaching member 18 provided with a sleeve 19 which loosely engages about the laterally extending leg of the bell crank 11, and is held against longitudinal movement by means of a collar 20 which is secured to the bell crank 11 and positioned within a slot 21 provided intermediate the ends of the sleeve 19.

A rearwardly extending frame supporting structure 22 is secured to the sleeve 19 and the forward end of the plow frame 16 is secured, as by bolts 23 passing through a plate 24 to the side of the frame supporting member 22. The draw bar 10 is supported in the desired position with the outer ends 11 thereof held against vertical rocking movement by means of a transversely extending bar 25 secured as by clamping members 26 to the forward end of the tractor frame F.

Each end of the bar 25 has a depending threaded rod 27 passing therethrough, which rod 27 is provided with an eye 28 loosely receiving the outer end of a bell crank 11. A pin 29 passes through the bell crank 11 adjacent the outer end thereof and holds the bracing or supporting member 27 against outward movement on the laterally extending leg of the bell crank 11. A nut 30 entending leg of the bell crank 11. A nut 30 engages the upper end of the threaded member 27 and in this manner, the draw bar supporting member 27 can be adjusted vertically so as to adjust the forward end of the frame 16 relative to the frame F.

A pair of collars 31 are secured one on each side of the two clamping members 26 for the bracing member 25, and these collars are constructed in the form of a split ring having parallel ears through which a bolt 32 passes so as to tighten the collar 31 about the bracing member 25, which bracing member 25, in the present instance, is constructed in the form of an elongated tubular member.

A hanger bracing member 33, which is provided with an L-shaped forward end portion 34, is secured at one end to the forward end of the frame F and extends laterally, and is provided on the long or rearwardly extending leg 35 with a plurality of spaced apertures 36 for receiving a securing member 37 which passes through a selected aperture 38 in the draw bar supporting member 12. In this manner, the lower portion of the supporting member 12 is held against rearward movement under the strain of the plow blades 17 by means of the bracing member 33.

The plow frame 16 is adjusted vertically relative to the frame F so as to permit the cutting or loosening of the ground by means of the plow 17 through the medium of a hand lever 39, which is pivoted at the lower end thereof on a pivot 40 carried by a toothed rack structure 41. This toothed rack structure 41 is supported on a pair of plates 42 and 43. The plate 42 extends inwardly and laterally of the frame F, and is secured at the inner end thereof to the top of the frame F by means of bolts 44, and the supporting plate 43 extends rearwardly and is secured as by bolts and securing members 45 to the rear axle housing or power take-off housing 46 carried by the tractor frame F. The lever 39 is provided with a forwardly extending arm 47 provided with a plurality of apertures 48, and this arm 47 is braced relative to the lever 39 by means of a bracing member 49. A chain or flexible member 50 is secured at one end to the arm 47 and at the opposite end to a clamp 51 engaging about the frame 16. In the present instance, there are two of these hand levers 39 which are mounted one on each side of the frame F. In this manner, each earth working implement is operated as to the depth of its cutting one independent from the other.

In the use and operation of this device, the bell crank portion 11 may be adjusted relative to the frame F by means of the adjusting member 27, and when the tractor is being moved over the ground, the lever 39 can be rocked forwardly so as to lower the arm 47 and coactively lower the plow frame 16. When in inoperative position, the lever 39 is rocked rearwardly, thereby raising the arm 47 and raising the plow frame 16, so that the earth working member 17 will be supported above the ground.

It will be noted from the foregoing that an attachment has been provided which can be mounted on a conventional tractor frame structure without disturbing the present parts of the frame structure but at the same time providing an earth working means to cultivate or loosen the ground.

It is, of course, understood that any conventional type of earth working member may be mounted on the frame structure 16, and the blade 17 is shown only as an example of one type of earth working implement which may be attached to this frame 16.

It is, of course, also understood that various changes and modifications may be made in the details of construction and design of the above specifically described embodiment of this invention without departing from the spirit thereof, such changes and modifications being restricted only by the scope of the following claims.

What is claimed is:—

1. The combination with a tractor having a frame, of a drawbar having a bell crank at each end thereof, a pair of drawbar supporting plates loosely engaging the intermediate portion of the drawbar, means for securing the plates to the tractor frame one on each side of the frame, an elongated member positioned on the forward portion of the tractor, an earth working member carried by each bell crank portion, and means carried by the opposite ends of the elongated member and engaging the bell crank portions of the drawbar to support the bell crank portions of the drawbar in vertically adjusted position relative to the drawbar supporting means.

2. The combination with a tractor having a frame, of a drawbar having offset opposite end portions, means engaging the intermediate portion of the drawbar and engaging the frame of the tractor to support the drawbar transverse to the length of the tractor in a manner to permit rocking of the drawbar, an earth working member carried by each offset portion of the drawbar one on each side of the tractor frame, means for rocking the earth working members into operative or inoperative position, and means fixedly carried by the tractor frame and engaging the offset portions of the drawbar to support said offset portions in adjusted position relative to the frame.

3. The combination with a tractor having a frame, of a drawbar having forwardly offset opposite end portions, means engaging the tractor frame and the drawbar to support the drawbar for rocking movement relative to the frame, a pair of earth working members, means for rockably securing the members to the offset portions of the drawbar there being one member on each side of the tractor frame, a transversely extending bar, means for fixedly securing the bar to the forward end of the tractor frame, and means engaging each end of the bar and the offset portions of the drawbar to support said offset portions in vertically adjusted position.

CARL A. ZIESCHANG.